Aug. 20, 1957   H. W. STANLEY ET AL   2,803,055
CLAMPS FOR CONCRETE FORMS
Original Filed April 29, 1949
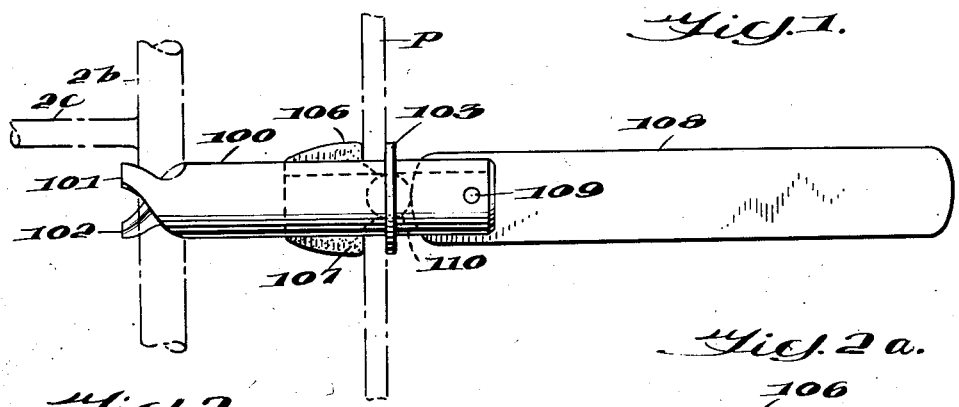
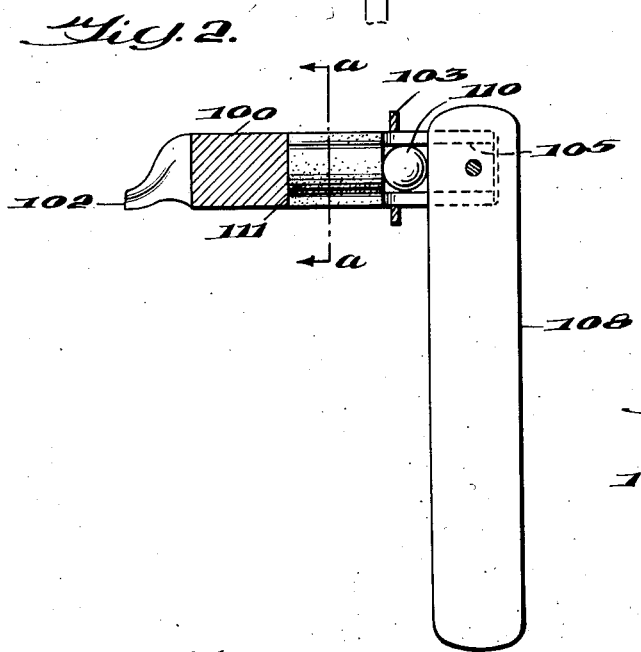
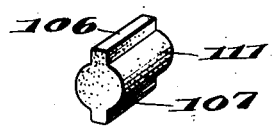
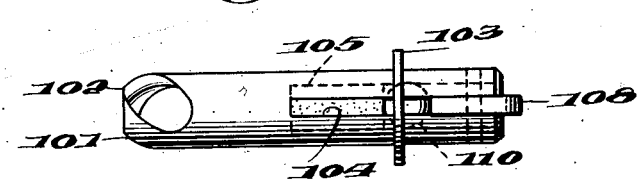
Inventors
HARRY W. STANLEY,
RALPH H. STANLEY,
By Ralph B. Stewart
ATTORNEY

2,803,055

CLAMPS FOR CONCRETE FORMS

Harry W. Stanley, Arlington, and Ralph H. Stanley, Glendale, Calif., assignors of one-fifth to Charles N. Stanley, Glendale, Calif.

Original application April 29, 1949, Serial No. 90,378, now Patent No. 2,670,819, dated March 2, 1954. Divided and this application October 28, 1953, Serial No. 388,866

5 Claims. (Cl. 29—286)

This invention relates to clamping devices designed especially for use in supporting a panel in a concrete form in spaced relation to a re-inforcing truss, although the invention is not limited to this particular application.

This application is a division of our copending application Serial No. 90,378, filed April 29, 1949, now Patent 2,670,819, granted March 2, 1954, and the clamping device described herein is useful in connection with reinforcing trusses of the type disclosed in our copending application.

An object of the present invention is to devise a releasable clamp for securing a form panel to the reinforcing truss in a concrete structure, thereby avoiding the necessity for the use of external support for the panel.

Another object is to devise a clamp which may be easily removed from the formed concrete structure without leaving projecting metal parts to be cut away.

The invention may be explained in connection with the accompanying drawing in which:

Figure 1 is an elevational view of the clamp as used to fasten the pouring form panels to the truss structure;

Figure 2 is an elevational view, partly in section, of the clamp in the unlocked position; Figure 2a is a section of Figure 2 taken along the line a—a;

Figure 3 is a plan view of the bolt or main member of the clamp; and

Figure 4 is a perspective view of the rubber core of the clamp bolt which forms the releasable latch member.

Figure 1 is a side elevational view of the clamp applied to hold a form panel P in spaced relation to a truss structure, the fragmentary parts of the panel and the truss being shown in dotted lines. The panel P, shown in end elevation, is arranged parallel with one face of the truss which includes vertical stud runners spaced apart at regular intervals, only one stud runner being shown at 2b. Each stud runner in one face of the truss is connected to a companion stud runner in the rear face by spaced transverse struts only one of which is shown at 2c. The stud runners preferably are formed of round rod stock.

The clamp comprises an elongated bolt 100 of round section extending through a hole formed in the panel P and having a pair of helix jaws 101 and 102 formed at the ends thereof for engaging a truss member, such as one of the vertical stud runners 2b. The ends of the helical jaws are separated enough to receive the rod-like member 2b between them, and by turning the bolt about 90° in a clockwise direction about its axis, the jaws will become entwined about the stud and will effectively clamp the bolt to the stud. A ring 103 is secured to the bolt 100 near the rear end and forms a head for the bolt against which the panel P is seated. The bolt 100 is slotted by a slot 104 (see Figure 3) from the rear end thereof to a point in front of the panel P, and the slotted portion of the bolt is also formed with a cylindrical bore 105.

A latching arrangement is provided for latching the panel P against the bolt head 103 by means of a pair of expandable latch members 106 and 107 which are normally located within the slot 104 on opposite sides of the bolt and in front of the panel P. The arrangement for expanding the latch members 106 and 107 into operative position includes an elongated handle 108 having one end thereof pivotally mounted in the slot 104 of the bolt 100 by means of a pin 109. The short end of the handle which operates within the slot 104 serves as a cam surface pressing against a ball element 110 located within the bore 105. In the modification shown in the drawing, the latch elements 106 and 107 are formed as oppositely extending, lateral ribs on a cylindrical plug 111 formed of resilient but distortable material such as rubber, the plug being shown in perspective in Figure 4. Plug 111 is normally designed to fit snugly within the bore 105 and the ribs 106 and 107 normally do not extend beyond the outer surface of the bolt 100, see Figures 2 and 2a.

With the handle 108 arranged at right angles to the bolt 100, as shown in Figure 2, no pressure is applied to the plug 111 through the ball 110, and it will be understood that the handle of the clamp must be in this position when the bolt of the clamp is to be passed through the hole in the panel P and clamped to the truss member. After the helix jaws have been brought into locking engagement with the stud runner, the handle 108 is moved from the position shown in Figure 2 to the position shown in Figure 1 where the cam end of the handle pushes the ball 110 against the plug 111. The pressure on the plug 111 distorts the plugs and forces the ribs 106 and 107 radially outward into the latching positions shown in Figure 1. Thus, the panel P is securely clamped against the bolt head 103 and held in proper spaced relation with respect to the truss stud 2b. It will be understood that other clamps may be used for supporting a similar panel on the opposite side of the truss, and that after concrete has been poured between the two panels and has become set, the pouring form panels may be removed simply by moving the handle 108 of the clamp to the position shown in Figure 2 and then turning it in a direction to unscrew the helix jaws from the truss member. Removal of the pressure on the plug 111 when the handle is moved to the position of Figure 2 allows the latching ribs 106 and 107 to recede into the slot 104, and by turning the handle 108 in a counterclockwise direction, the bolt may be disengaged from the truss member, and the clamp may be withdrawn from the formed concrete and from the panel P.

It will be understood that expandable latching members 106 and 107 could be formed of mechanical elements normally biased to a position within the slot 104 and being movable by the ball 110 to the latching position, but we prefer to use the latching arrangement described above for the reason that the distortable rubber plug 111 completely fills all of the clearance spaces between the latching elements and the slot in the bolt, thereby preventing concrete from entering these spaces.

We claim:

1. A clamp device comprising a round bolt having a pair of helical jaws formed at the forward end thereof and adapted for entwined engagement with a rod-like member to be clamped, a shoulder on said bolt near the other end thereof and forming an annular clamping seat, the rear end of said bolt having a central bore formed therein extending forwardly beyond the said shoulder, a latching element normally positioned within a slot formed in said bolt in front of said shoulder and being movable radially out of said slot into clamping relation with said shoulder, an operating member for said latching element mounted within said bore, and a handle member mounted on the rear end of said bolt for moving said operating member within said bore.

2. A clamp according to claim 1 wherein said latch operating means includes an element movable in said bore, a handle pivotally mounted upon the rear end of said bolt and having a cam portion engaging said movable member and operable to cause said movable element to expand said latching means when said handle is moved from a position at right angles to the bolt to a position in alignment with said bolt.

3. A clamp in accordance with claim 2 wherein said handle member assumes a position substantially at right angles to said bolt in order to retract said latching element, whereby said handle member may also be used to turn said bolt in order to engage and disengage said helical jaws and said rod-like member.

4. A clamp according to claim 1 wherein said radially movable latching means comprises a rubber plug positioned in said bore and having laterally extending ribs positioned within said slot on opposite sides of said bore, and the operating means for said latching means comprises means for compressing said plug along its length and thereby forcing said ribs radially outward into clamping relation with said shoulder.

5. A clamping device comprising a bolt provided at one end with jaws consisting of a pair of oppositely positioned projecting teeth, each tooth projecting helically in the same direction axially of the bolt, the inner faces of the teeth being spaced to permit a bar to be inserted therebetween and the dimension across the outer faces of the teeth being substantially the outer diameter of the bolt, the center portion of the bar being provided with a pair of oppositely positioned slots and an annular shoulder adjacent thereto with the slots positioned between the shoulder and said one end of the bolt, the bolt being hollow from that portion containing the slots to the other end, radially expansible latching means positioned within the bolt adjacent the slots, and means connected to said other end of the bolt to expand said latching means through said slots.

References Cited in the file of this patent

UNITED STATES PATENTS

| | | |
|---|---|---|
| 676,785 | Toelpe | June 18, 1901 |
| 1,245,361 | Lutz | Nov. 6, 1917 |
| 1,676,775 | Doherty | July 10, 1928 |
| 2,029,147 | Anderson | Jan. 28, 1936 |
| 2,098,686 | Holm | Nov. 9, 1937 |